United States Patent
Parikh et al.

(10) Patent No.: US 6,411,972 B1
(45) Date of Patent: Jun. 25, 2002

(54) METHOD AND APPARATUS FOR FILLING IN FORMS BY SEGMENTS USING A SCANNER AND A PRINTER

(75) Inventors: Shrikant N. Parikh, Mesquite; George C. Manthuruthil, Coppell; Hari N. Reddy, Grapevine, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/045,499

(22) Filed: Apr. 8, 1993

(51) Int. Cl.[7] .......................... G06F 15/00; G06F 17/21
(52) U.S. Cl. ...................... 707/507; 707/531; 345/339
(58) Field of Search .............................. 364/401, 400, 364/419.1, 419.14, 419.17; 386/58, 62, 63, 65; 395/144, 146, 145, 149, 148; 707/506, 507, 508, 531; 705/1, 500; 704/1; 345/339

(56) References Cited

U.S. PATENT DOCUMENTS

| | | | |
|---|---|---|---|
| 4,553,206 A | | 11/1985 | Smutek et al. ............ 364/419.1 |
| 4,695,897 A | | 9/1987 | Watanabe .................... 358/296 |
| 4,755,877 A | * | 7/1988 | Vollert ......................... 358/401 |
| 4,760,467 A | | 7/1988 | Marazzi et al. .............. 358/303 |
| 4,814,798 A | * | 3/1989 | Fukae et al. ................. 346/160 |
| 4,858,171 A | | 8/1989 | Furusawa et al. ......... 364/419.1 |
| 4,860,029 A | * | 8/1989 | Iseda ...................... 346/76 PH |
| 4,866,539 A | | 9/1989 | Marazzi et al. .............. 358/303 |
| 5,003,614 A | | 3/1991 | Tanaka et al. ................. 382/18 |
| 5,020,122 A | | 5/1991 | Walsh et al. ................... 382/56 |
| 5,091,868 A | | 2/1992 | Pickens et al. .............. 395/148 |
| 5,126,788 A | * | 6/1992 | Koga .......................... 355/200 |
| 5,129,053 A | * | 7/1992 | Makihara ..................... 395/149 |
| 5,140,650 A | | 8/1992 | Casey et al. ................... 382/61 |
| 5,235,654 A | * | 8/1993 | Anderson et al. ............. 382/61 |
| 5,245,447 A | * | 9/1993 | Stemmle ...................... 358/472 |
| 5,248,139 A | | 9/1993 | Garland et al. ............. 271/184 |

FOREIGN PATENT DOCUMENTS

EP 0232905 * 8/1987

OTHER PUBLICATIONS

Gerlach et al., "System For Simplified Form Fill–In Using CRT Display", IBM Disclosure TDB 04–79, p. 4323–4329, Apr. 1979.

* cited by examiner

Primary Examiner—Joseph Thomas
(74) Attorney, Agent, or Firm—Geoffrey A. Mantooth

(57) ABSTRACT

A printer is provided with a small scanner located upstream along a paper path from a printing device such as a print head. A form is loaded into the printer and is advanced incrementally along the paper path. A segment of the form is scanned by the scanner. The scanned segment is displayed on a user interface. A user may provide information in selected blank spaces of the displayed segment with a keyboard. The user may then command the printer to print, wherein the information is printed in the selected blank spaces of the segment by the print head. The next segment of the form is scanned and displayed to the user.

9 Claims, 3 Drawing Sheets

METHOD AND APPARATUS FOR FILLING IN FORMS BY SEGMENTS USING A SCANNER AND A PRINTER

TECHNICAL FIELD OF THE INVENTION

The present invention relates to methods and apparatuses for filling in forms on a data processing system.

BACKGROUND OF THE INVENTION

One application of data processing systems is word processing, wherein documents with text and even graphics can be created, stored and modified electronically. A printer is utilized to obtain a copy of the document on paper.

One common requirement in office environments is the filling in of forms. Before word processing with data processing systems, forms were filled in using typewriters. Because word processing offers so many advantages over typewriters, it is desirable to provide the capability of filling in forms using a word processing system. However, the prior art methods of filling in forms with word processing systems are too expensive or too clumsy. Therefore, many offices equipped with word processing systems continue to use typewriters to fill in forms.

One prior art method of filling in forms involves manually creating the form on the word processing system. An operator duplicates or creates the form. This is a time consuming process and becomes too expensive if there are many different forms that need to be implemented on the word processing system. Furthermore, this method is not practical for one-of-a-kind forms. These types of forms are generated by an outside or out of company source and are filled in just once.

Another prior art method involves using a scanner and special purpose software for creating an image of the form on a display and for printing the form. This method is expensive, requiring an expensive scanner and expensive software. As a result, this method is not in wide use.

Still another prior art method uses software drivers, which allow a printer to be used in a typewriter mode. The disadvantage of this method is that as a user types, the user must both watch the monitor or screen to see the results of the typing and also look inside the printer to determine where the print head is located to determine if the typing will occur where desired. This method is very clumsy to utilize.

SUMMARY OF THE INVENTION

It is an object of the present invention to provide a low cost method and apparatus for filling in forms with a data processing system.

A method of the present invention scans a segment of a form and displays the scanned segment. Information is accepted in selected locations on the scanned segment. The accepted information is printed in the selected locations on the scan segment. The scanning, accepting and printing steps are repeated for a new segment of the form.

An apparatus of the present invention includes means for receiving from a scanner a scanned segment of the form and for displaying the scanned segment, means for accepting information in selected locations on the scanned segment and means for providing to a printer the information in the selected locations on the scanned segment.

In another aspect of the present invention, there is provided an apparatus for filling in forms that includes a user interface, a data processing system that is connected to the user interface and a printer that is connected with the data processing system. The printer includes means for printing on paper, a paper path that is located adjacent to the means for printing and a scanner that is located adjacent to the paper path and upstream along the paper path from the means for printing.

The present invention allows automatic interaction between a user and a form which the user desires to fill in. An incremental portion of the form is scanned and displayed to the user. The user provides the desired information in selected locations on the scanned portion (which are typically blank spaces on the form). The user then commands a printing operation, wherein the form advances and the print head, which is located downstream from the scanner, prints information on the scanned portion. The next adjacent incremental portion is scanned and displayed to the user, wherein the process is repeated. The present invention provides a low cost method and apparatus for filling in forms as a full size scanner is not required.

DESCRIPTION OF THE INVENTION

Figure 1:
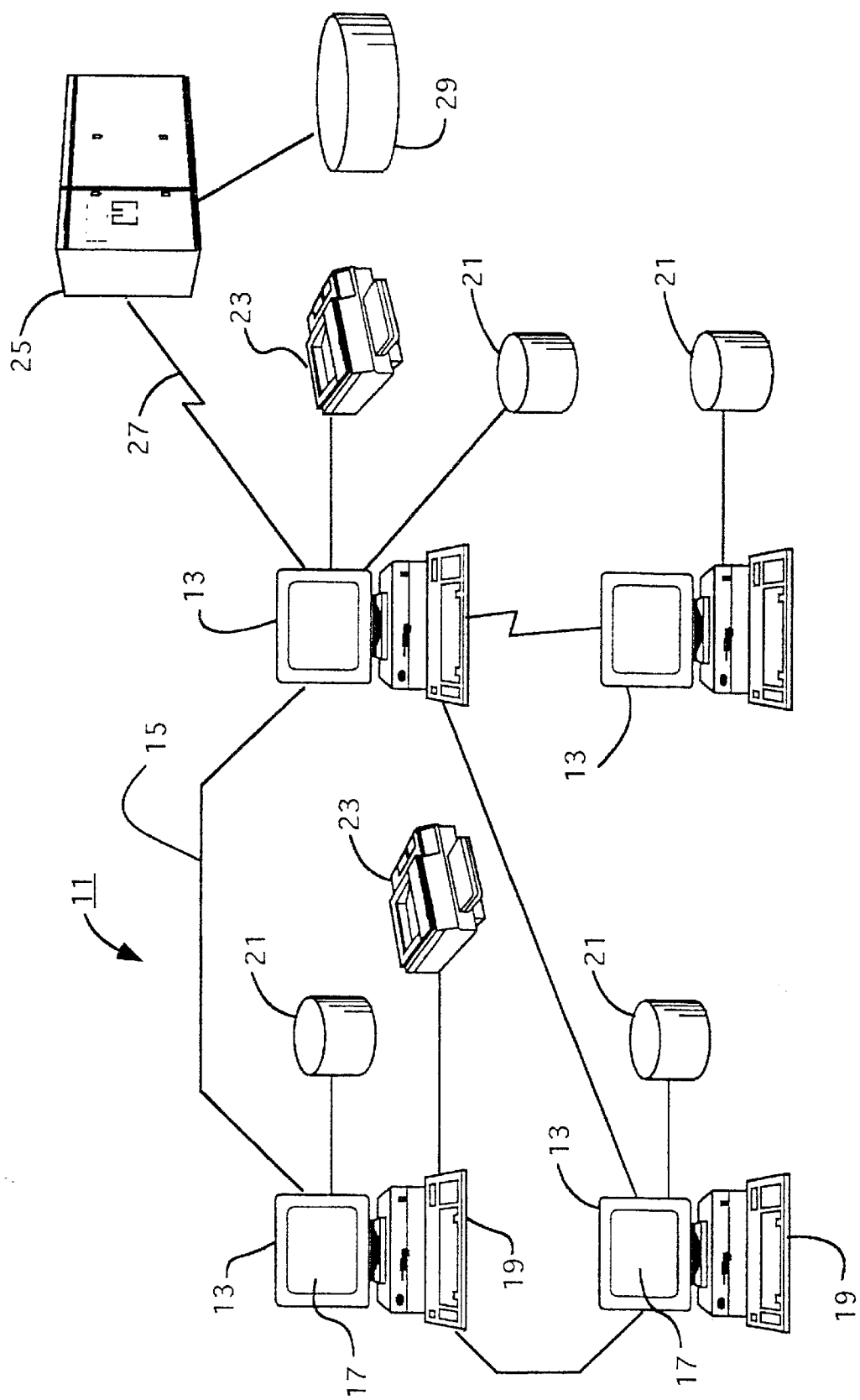
FIG. 1 is a schematic diagram of a data processing system on which the present invention can be practiced.

In FIG. 1, there is shown a schematic diagram of a data processing system 11, upon which the present invention can be practiced. The data processing system 11 includes plural individual computers 13 which are connected together in a local area network (LAN) 15. Each computer 13 includes a user interface, which has a display screen 17 and a keyboard 19. Each computer 13 may also be connected to a storage device 21. One or more of such storage devices 21 may be utilized, in accordance with the present invention, to store applications or resource objects which may be periodically accessed by any user within the data processing system 11.

The data processing system 11 may also include a mainframe computer 25 that is connected to one of the computers by a communication link 27. The mainframe computer 25 may also be coupled to a storage device 29 which may serve as a remote storage for the computers.

Each computer may also be connected to a printer 23. The printer 23 can be of any type, such as laser, thermal or ink jet. The printer thus may use conventional and commercially available art for its printing operations.

Figure 2:
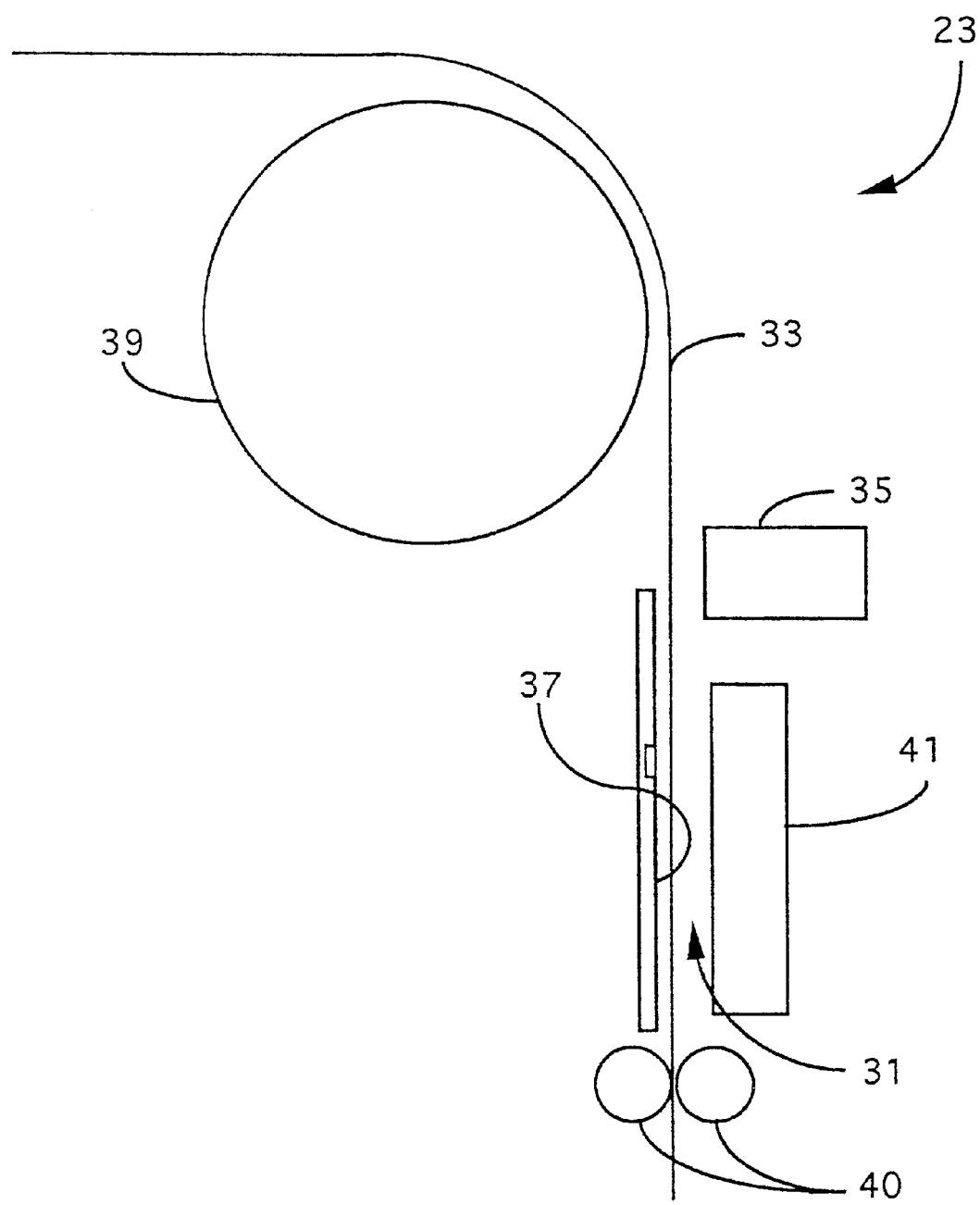
FIG. 2 is a schematic diagram of a printer of the present invention, in accordance with a preferred embodiment.

Referring to FIG. 2, some of the components of the printer 23 are shown. The printer has a path 31 for directing paper 33 past a print head 35. A support surface 37 is located on the opposite side of the path 31 from the print head 35. Therefore, a piece of paper 33 traversing the paper path 31 is interposed between the support surface 37 and the print head 35. The paper moves in the direction shown by the arrow. After the paper exits past the print head 35, it proceeds to a drum or roller 39. The drum 39 is used to advance the paper 33 along the paper path 31. In FIG. 2, the relative sizes of the components are schematically drawn. The printer has other components as well, such as a tray or slot for feeding in paper, rollers 40 for assisting the drum 39 in moving the paper along the paper path, and a tray or slot for receiving paper that exits the printer.

A scanner 41 is located adjacent to the print head 35. The scanner 41 is positioned upstream on the paper path 31 from the print head 35. Thus, as the paper is fed through the printer, it passes by the scanner 41 before it encounters the print head 35. The scanner 41 is located on the same side of the paper 33 as the print head 35. Thus, the paper 33 is interposed between the support surface 37 and the scanner 41.

The scanner 41 can be an optical character reader and may be of the high resolution type to read fine print. The scanner is sized to read a few lines (for example, 1–5 lines) of a form at a time. The scanner may be of the type that reads the desired number of lines at the same time, or else of the type that reads a row or rows of pixels, advances the form or paper to read next row or rows of pixels, and so on. As an example, the scanner 41 could have the following specifications: 400 dots per inch (dpi), 8 bit gray scale, 24 bit color scale recognition, single pass color scanning mechanism and automatic exposure. The scanner 41 need not have color recognition capability nor 400 dpi resolution, as most forms do not have color or fine print.

The print head 35 and scanner 41 are connected to control electronics in the printer 23. The control electronics are connected to one of the computers 13.

Figure 3:
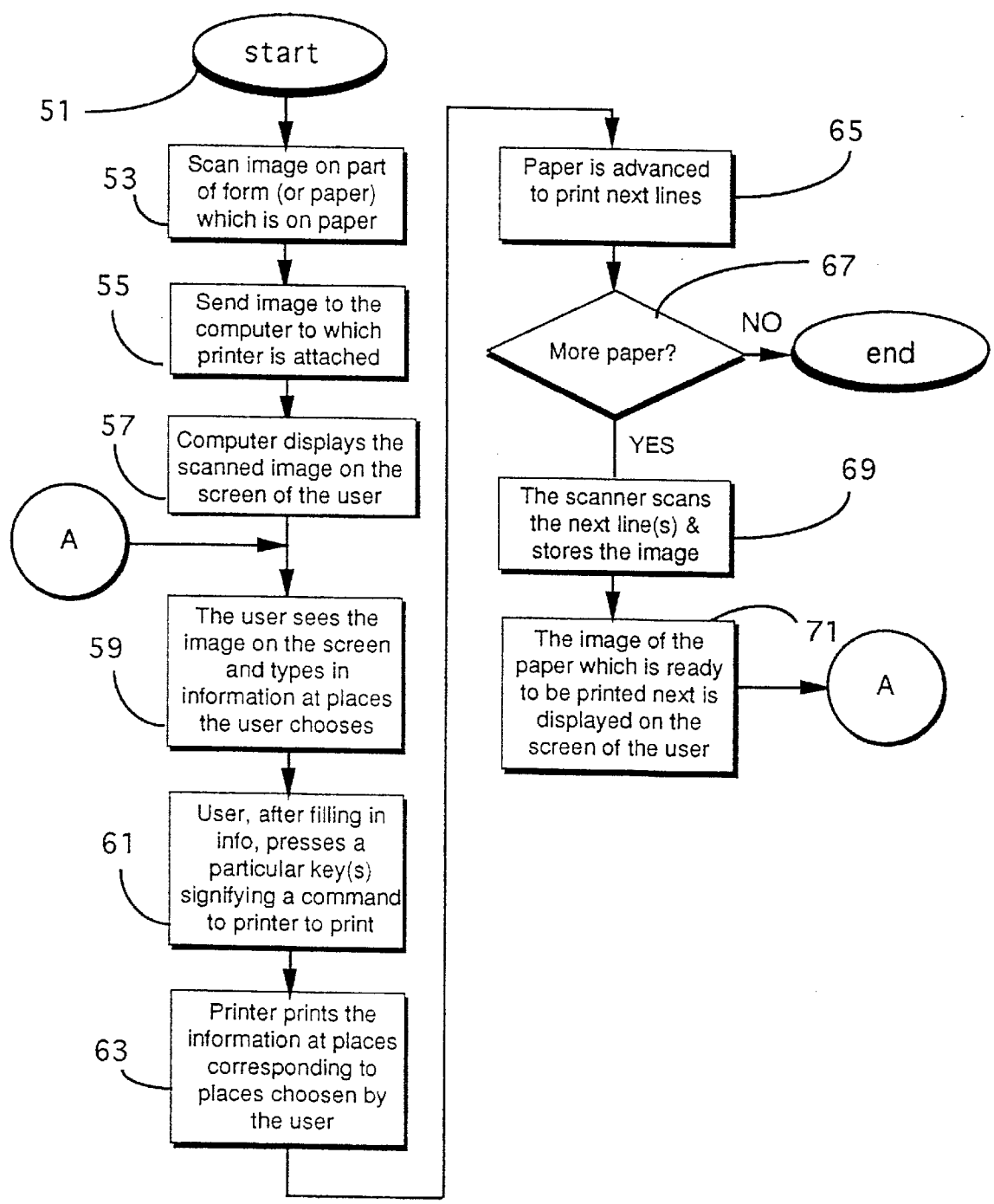
FIG. 3 is a flow chart showing the method of the present invention, in accordance with a preferred embodiment.

The method of the present invention, in accordance with a preferred embodiment, will now be described referring to FIGS. 2 and 3. In the flow chart of FIG. 3, the following graphical conventions are observed: a rectangle for either a process or function, a diamond for a decision and a circle for a connector in exiting to or entering from another part of the flow chart. These conventions are well understood by programmers skilled in the art of data processing and user interfaces and the flow charts are sufficient to enable a programmer skilled in the art to write code in any suitable computer programming language, such as BASIC, PASCAL or C for a computer such as the IBM Personal System/2 (PS/2) family of computers which support these languages.

The method can be embodied in a software driver for one or more of the computers 13 in FIG. 1. A user loads a form 33 into the printer 23, with the ink side of the form oriented so as to face the print head 35 and the scanner 41. A typical form that can be filled in with the present invention is the declaration and power of attorney for patent application filed with this patent application. This form contains printed matter such as required statements for the inventors, as well as blank spaces for information such as the names and addresses of the inventors. The blank spaces are underlined. The form is loaded into the printer so that the top of the form is fed in first, with the bottom of the form fed in last. Thus, the lines on the form are oriented transversely to the direction of travel of the form.

The operator starts the method, step 51, by executing the software driver. The form 33 is advanced inside of the printer to the scanner 41, where a segment of the form, such as a few lines, are scanned, step 53. Rollers inside of the printer, along with drum 39 are used to advance the form.

Next, in step 55, the scanned segment is sent to the computer 13 to which the printer 23 is attached. The computer 13 displays the image of the scanned segment of the form 33 on the display screen 17, step 57

In step 59, the user selects a blank space on the form 33 by positioning the cursor therein. Then, using the keyboard 19 the user types the information desired in the selected blank space. The user may then select another blank space in the segment that is displayed and type in information. The information may be edited by deleting, modifying, moving, etc.

After the segment being displayed is filled in, the user then presses a predesignated key or keys (such as RETURN) on the keyboard 19, step 61, to command the printer to print the information in the displayed segment of the form 33. In step 63, the printer 23 prints the information in the selected places chosen by the user in step 59. Specifically, the printer advances the form until the first line of the scanned segment is adjacent to the print head 35. The printer prints the information in the selected blank spaces on the first line. When printing operations on the first line have been completed, the form is advanced to print the next lines, step 65. Thus, the printer prints the information in the scanned segment of the form.

Some printers print rows of pixels instead of a full line of text. For these printers, the print head, which may move horizontally across the form page, prints a first row of pixels, advances the form to present a second row of pixels to the print head, prints the second row of pixels, advances the form to present a third row of pixels to the print head, and so on until the segment of the form that is displayed on the screen has been filled in with the information provided by the user.

In step 67, the method determines if there is more of the form to be scanned. If YES, then in step 69, the form is advanced along the paper path and the scanner 41 scans the next line or lines in the next adjacent segment. The image of the scanned segment is stored. In step 71, the stored image is displayed on the screen 17 to the user. The method returns to step 59, wherein the user types in information into selected areas on the displayed segment of the form.

The steps of printing information on a previously scanned segment and scanning the next adjacent segment may occur sequentially or simultaneously, depending on the spacing between the scanner 41 in the print head 35.

Returning to step 67, if the result is NO, there is no more paper to be scanned, then the method ends.

The present invention makes filling in forms simple. The user need only place the form in the input tray or slot of the printer and execute the software driver program. The form is automatically advanced, a segment at a time, through the printer. Each segment is scanned and displayed on the screen, so that the user can fill in the blank areas. After each segment is filled in on the display with information to the satisfaction of the user, the printer prints the information on the form in the desired locations and scans and displays the next segment to repeat the process.

The number of lines in a segment may be selected by the user. For example, the user may select that five lines of the form are to be scanned in the segment. Alternatively, the user can specify the segment size using linear measurements such as inches or centimeters. For example, the user may specify that each segment contain two inches of the form.

The screen 17 may display more than one segment at a time. For example, if each segment contains three lines, then every time a new segment is scanned, the display on the screen scrolls upwardly. Thus, the upper portion of the screen contains segments that have already been printed on the form, while the lower portion of the screen contains the "working" segment which is receptive to typed information and which has not yet been printed on the form.

With the present invention, an expensive scanner that must scan a whole form at once is not required. Instead, a smaller and less expensive scanner is utilized and made a part of the printer. In addition, the need for a conventional typewriter is eliminated.

Color on forms can be used to provide error detection. For example, certain blank areas on a form may be designated for numerical inputs. These particular blank areas can be colored, such as light blue. If the user mistakenly types in alphabetic information in the light blue areas, which are reserved for numbers, the method warns the user that an incorrect input has been detected before this information is printed onto the form. This allows the user to correct the information that is in the blank space.

The color input detection scheme can be implemented as follows: After step 59, where the user types in information at the selected place, the method determines if there is color present on the scanned segment of the form. If No, there is no color, then the method proceeds directly to step 61. However, if YES, there is color, then the method determines if the user has typed in the correct type of information into the selected color coded space. This is performed by accessing a stored table that lists the allowed type or types of information for each color. Then, the type of information required for the detected color is determined from the table. The type of information that was input by the user is then compared to the required type of information. If there is a match, that is the user input the correct type of information, then the method proceeds to step 61. If there is a mismatch, then a warning is displayed to the user that the type of information input is incorrect and the method returns to step 59 to allow additional inputs. A color scanner is of course required to detect the colors on the form.

Tabbing that corresponds to the layout of the displayed form segment can be utilized to make use simpler. The blank spaces on a displayed segment may be spaced widely apart. In step 59, the method detects the location of the blank spaces on the screen 17. Use of the tab key moves the typing cursor sequentially among the blank spaces on the screen, causing the typing cursor to skip over the nonblank spaces. The direction or arrow keys can also be utilized to move the typing cursor among the blank spaces in the desired direction.

After the form has been printed, the scanned image of the form, in its entirety, can be stored for future use. Thus, the form can be reproduced, with its blank spaces. In addition, the form, as filled in with the user supplied information can be stored. Copies of the filled in form can be made on the printer. The information on the filled out form can be edited and the edited form can be reproduced on the printer.

The foregoing disclosure and the showings made in the drawings are merely illustrative of the principles of this invention and are not to be interpreted in a limiting sense.

What we claim is:

1. A method of filling in a form with a data processing system, comprising the steps of:
    a) providing a paper path with a scanner located upstream from a means for printing on paper;
    b) locating said form on said paper path;
    c) locating a segment of said form adjacent to said scanner;
    d) scanning said segment of said form with said scanner and displaying said scanned segment on said data processing system;
    e) accepting information in selected locations on said scanned segment;
    f) maintaining said form on said paper path and advancing said form along said paper path so as to move said scanned segment from said scanner to said means for printing on paper;
    g) printing said information in said selected locations on said scanned segment with said means for printing on paper and repeating steps c)-g) with a next segment until said form has been completed.

2. The method of claim 1 wherein said step of scanning a segment of said form further comprises the step of scanning one or more lines of said form.

3. The method of claim 1 wherein said step of accepting information in selected locations on said scanned segment further comprises the step of allowing a user to type in said information in said locations selected by said user.

4. The method of claim 1, wherein said step of repeating said steps c)–g) further comprises the step of advancing said form along said paper path so as to position said scanned segment adjacent to said means for printing and said next segment which is adjacent to said scanned segment adjacent to said scanner.

5. The method of claim 1, wherein:
    a) said step of scanning a segment of said form further comprises the step of scanning one or more lines of said form;
    b) said step of accepting information in selected locations on said scanned segment further comprises the step of allowing a user to type in said information in said locations selected by said user;
    c) said step of repeating said steps c)–g) further comprises the step of advancing said form along said paper path so as to position said scanned segment adjacent to said means for printing and said next segment which is adjacent to said scanned segment adjacent to said scanner.

6. An apparatus for filling in a form with a data processing system, comprising:
    a) a scanner positioned upstream along a paper path from a means for printing on paper;
    b) means for receiving from said scanner a scanned segment of said form and for displaying said scanned segment on said data processing system;
    c) means for accepting information in selected locations on said scanned segment;
    d) means for maintaining said form on said paper path and for advancing said form along said paper path so as to move said scanned segment from said scanner to said means for printing on paper;
    e) means for providing to said means for printing on paper said information in said selected locations on said scanned segment.

7. The apparatus of claim 6 wherein said means for receiving from a scanner a scanned segment of said form further comprises means for scanning one or more lines of said form.

8. The apparatus of claim 7 wherein said means for accepting information in selected locations on said scanned segment further comprises means for allowing a user to type in said information in said locations selected by said user.

9. The apparatus of claim 6 wherein said means for accepting information in selected locations on said scanned segment further comprises means for allowing a user to type in said information in said locations selected by said user.

* * * * *